United States Patent
Wagner et al.

(10) Patent No.: US 9,509,346 B2
(45) Date of Patent: *Nov. 29, 2016

(54) CIRCUIT AND METHOD FOR A CIRCUIT

(71) Applicant: Infineon Technologies AG, Neubiberg (DE)

(72) Inventors: Christoph Wagner, Enns (AT); Herbert Jaeger, Linz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/950,420

(22) Filed: Nov. 24, 2015

(65) Prior Publication Data

US 2016/0080006 A1    Mar. 17, 2016

Related U.S. Application Data

(63) Continuation of application No. 14/136,230, filed on Dec. 20, 2013, now Pat. No. 9,214,978.

(51) Int. Cl.
| | |
|---|---|
| *H04B 17/00* | (2015.01) |
| *H04B 1/40* | (2015.01) |
| *H04B 1/04* | (2006.01) |
| *H04B 17/12* | (2015.01) |
| *H04B 17/10* | (2015.01) |

(52) U.S. Cl.
CPC ........ *H04B 1/04* (2013.01); *H04B 1/40* (2013.01); *H04B 17/0085* (2013.01); *H04B 17/10* (2015.01); *H04B 17/102* (2015.01); *H04B 17/12* (2015.01)

(58) Field of Classification Search
CPC ..... H03F 1/3247; H04B 17/14; H04B 17/24; H04B 17/102; H04B 17/103
USPC ............. 455/67.11, 115.1–115.4, 126, 226.1, 455/561
See application file for complete search history.

(56) References Cited

U.S. PATENT DOCUMENTS

| | | | |
|---|---|---|---|
| 9,214,978 B2* | 12/2015 | Wagner | ............ H04B 1/40 |
| 2011/0201283 A1 | 8/2011 | Lorenz et al. | |
| 2013/0010851 A1 | 1/2013 | Jaeger et al. | |
| 2014/0256376 A1 | 9/2014 | Weissman et al. | |

OTHER PUBLICATIONS

Non-Final Office Action dated Apr. 6, 2015 for U.S. Appl. No. 14/136,230.
Notice of Allowance dated Aug. 14, 2015 for U.S. Appl. No. 14/136,230.

* cited by examiner

*Primary Examiner* — Lee Nguyen
(74) *Attorney, Agent, or Firm* — Eschweiler & Associates, LLC

(57) ABSTRACT

A circuit comprises a transmitter to provide a transmit signal. The circuit also comprises a coupler element to receive the transmit signal at an input port, to provide a first representation of the transmit signal at an antenna port and a second representation of the transmit signal at a testing port. The circuit further comprises a monitoring receiver unit. The monitoring receiver unit is coupled to the testing port. Furthermore, the monitoring receiver unit is configured to determine a characteristic of the second representation of the transmit signal.

20 Claims, 5 Drawing Sheets

CIRCUIT AND METHOD FOR A CIRCUIT

REFERENCE TO RELATED APPLICATION

This Application is a Continuation of U.S. application Ser. No. 14/136,230 filed on Dec. 20, 2013, the contents of which are incorporated by reference in their entirety.

FIELD

Embodiments relate to a circuit and a method for a circuit.

BACKGROUND

Signal testing and signal monitoring is a process, which may be helpful for a wide range of applications, e.g. in the field of telecommunication. For example, testing and monitoring of a transmit signal chain having multiple transmitters or transceivers, may be helpful for transmit beam-forming or to establish functional safety. Reliable, fast and cheap testing (during production) of transmitter output power, phase difference, drift for multi-transmitter or transceiver architectures, etc. is essential for instance for vehicle radar applications with safety critical functions.

A conventional solution would be to characterize the transmit performance of the finished system in a special measurement environment to calibrate once and decide on pass or fail (or, in other words, a testing after final assembly), and then trust on proper operation when the system is in its operating environment, for example in a car. However, this solution may for example be sensitive to perturbations that may arise during operation or changing environmental conditions.

It is hence desirable to improve a concept for a circuit and a method for a circuit.

SUMMARY

According to one aspect, embodiments relate to a circuit. The circuit comprises a transmitter to provide a transmit signal. The circuit also comprises a coupler element to receive the transmit signal at an input port, to provide a first representation of the transmit signal at an antenna port and a second representation of the transmit signal at a testing port. The circuit further comprises a monitoring receiver unit. The monitoring receiver unit is coupled to the testing port. Furthermore, the monitoring receiver unit is configured to determine a characteristic of the second representation of the transmit signal.

According to another aspect, embodiments are further related to a method for a circuit. The method comprises a providing of a transmit signal. The method also comprises a providing of a first representation of the transmit signal based on the transmit signal. The method further comprises a providing of a second representation of the transmit signal based on the transmit signal. Moreover, the method comprises a receiving of the second representation of the transmit signal. Furthermore, the method comprises a determining of a characteristic of the second representation of the transmit signal.

Some embodiments relate to a transceiver circuit. The transceiver circuit comprises a transmitter to provide a transmit signal. The transceiver circuit also comprises a coupler element to receive the transmit signal at an input port, to provide a first representation of the transmit signal at an antenna port and a second representation of the transmit signal at a testing port. Furthermore, the transceiver circuit comprises a monitoring receiver unit coupled to the testing port. The monitoring receiver unit is configured to determine a characteristic of the second representation of the transmit signal. The transceiver circuit further comprises a further coupler element to receive a further transmit signal at a further input port and to provide a first representation of the further transmit signal at a further antenna port and a second representation of the further transmit signal at a further testing port. Moreover, the transceiver circuit comprises at least a further transmitter coupled to the further input port. The further transmitter is configured to provide a further transmit signal. The monitoring receiver unit is further coupled to the further testing port. The monitoring receiver unit is also configured to determine a characteristic of the second representation of the further transmit signal. The transceiver circuit also comprises a monitoring circuit coupled to the monitoring receiver. The monitoring circuit is configured to compare the characteristic of the second representation of the transmit signal to the characteristic of the second representation of the further transmit signal. The monitoring circuit is further configured to provide an adjustment signal. The adjustment signal causes a modification of the characteristic of at least one of the transmit signal and the further transmit signal if the comparison indicates that a deviation of the characteristic of the second representation of the transmit signal from the characteristic of the second representation of the further transmit signal is outside a predetermined range.

BRIEF DESCRIPTION OF THE DRAWINGS

Some embodiments of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
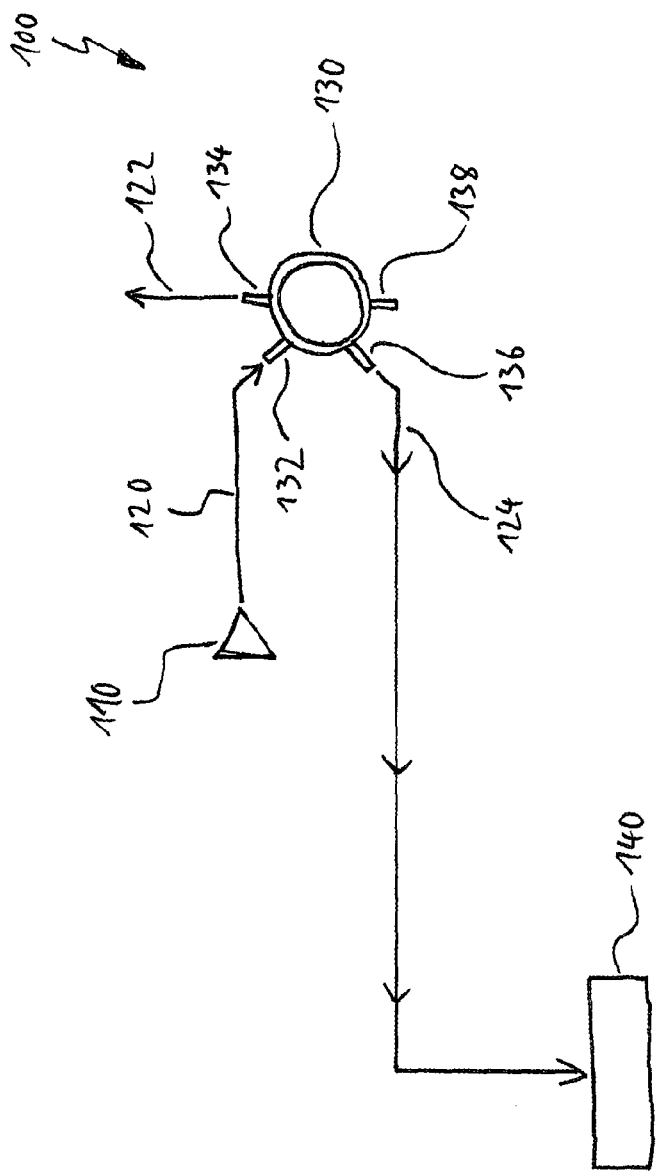
FIG. 1 shows a circuit diagram of a circuit according to an embodiment.

FIG. 1 displays a circuit 100 according to an embodiment. Circuit 100 comprises a transmitter 110 to provide a transmit signal 120. Circuit 100 also comprises a coupler element 130 to receive transmit signal 120 at an input port 132, to provide a first representation of transmit signal 122 at an antenna port 134 and a second representation of transmit signal 124 at a testing port 136. Circuit 100 further comprises a monitoring receiver unit 140. Monitoring receiver unit 140 is coupled to testing port 136. Furthermore, monitoring receiver unit 140 is configured to determine a characteristic of the second representation of transmit signal 124. It is therefore possible to monitor a signal path traversed by a transmit signal 120. A deviation of the second representation of transmit signal 124 from a given parameter range may for example be determined and quantified for a possible correction.

Signals described herein, such as transmit signal 120, and representations of said signals may be analog or digital signals, unless otherwise defined. Signals may further be of continuous or discrete form. A characteristic of a signal may comprise a frequency, amplitude or phase of the signal. Transmitter 110 may be a device configured to generate transmit signal 120 or to alter a previously available input signal such as a carrier frequency in order to provide transmit signal 120. Transmitter 110 may, for instance, also be configured to amplify a previously available input signal in order to provide transmit signal 120. In FIG. 1, transmitter 110 is exemplified as a power amplifier 110. Coupler element 130 may be a device comprising a multitude of interfaces for input and output of signals. Furthermore, coupler element 130 may be configured to receive an input at an interface and provide a corresponding output at one or more interfaces. In the embodiment shown by FIG. 1, coupler element 130 is implemented as a hybrid ring coupler, which is also known as a rat-race coupler 130. Rat-race coupler 130 comprises at least four interfaces, which are referred to as input port 132, antenna port 134, testing port 136 and receiver port 138 in the following. Due to its geometry, an input signal entering hybrid ring coupler 130 at a predetermined port may pass the ring in both directions, and thus interfere with itself constructively at ports located 60° or 180°, and destructively at ports located 120° away from the port receiving the input signal. Monitoring receiver 140 may be a device configured to receive and to characterize an input, e.g. by its course, phase, amplitude, duration or range of values. Transmit signal 120 may thus be monitored while being sent, which may be helpful for detecting possible sources of errors, for instance phase or amplitude shift. It is to be noted here that embodiments described herein are merely exemplary implementations and are not to be understood as being constrictive.

Figure 2:
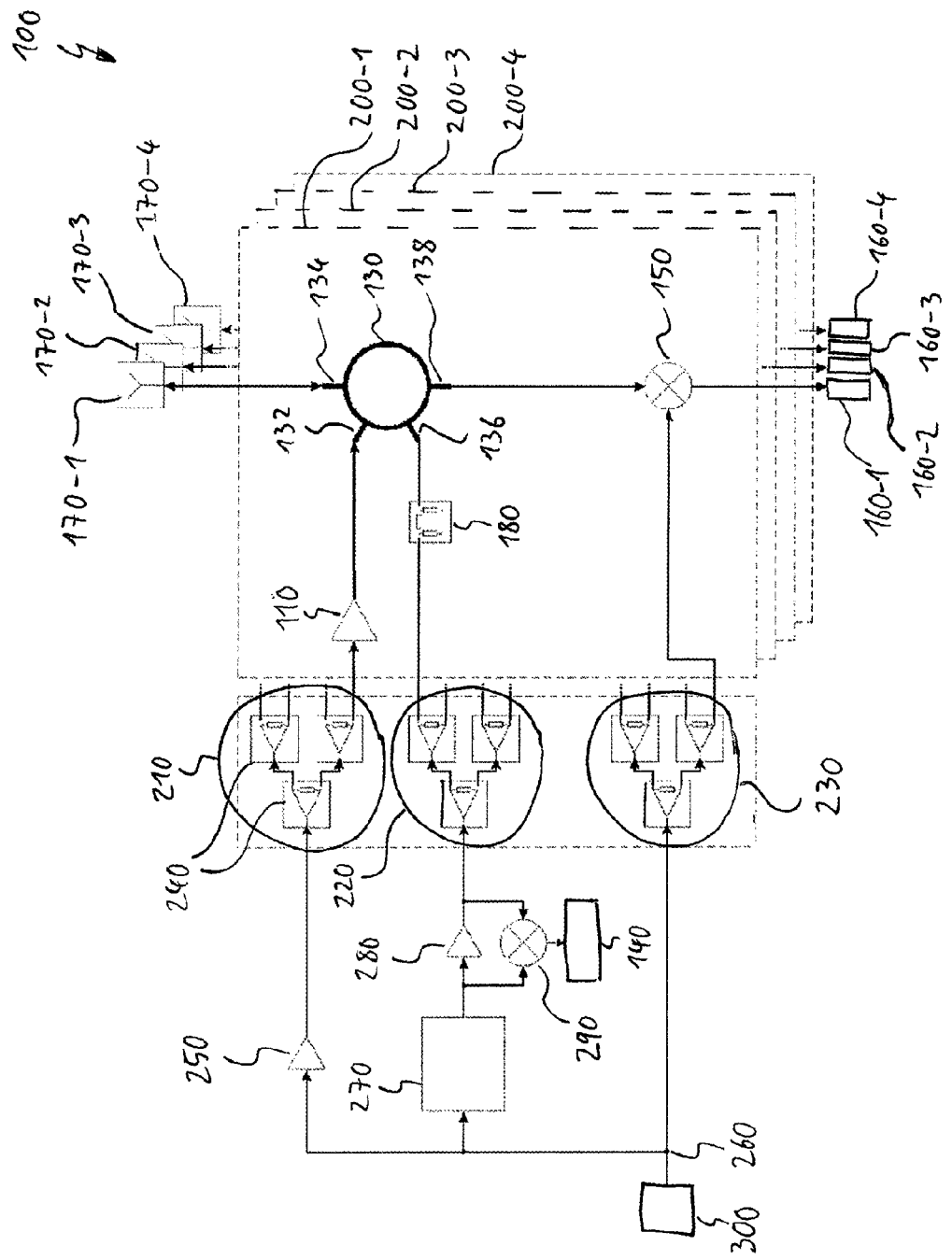
FIG. 2 shows a circuit diagram of a circuit according to another embodiment.

FIG. 2 shows a more detailed embodiment of a circuit 100 with additional optional components described in the following. In addition to the components described with respect to FIG. 1, FIG. 2 displays a receive mixer 150 coupled to receiver port 138 of rat-race coupler 130. Receive mixer 150 is further coupled to a signal receiver 160-1. Antenna port 134 is coupled to an antenna 170-1, and testing port 136 is coupled to an attenuator or a filter 180.

Rat-race coupler 130, transmitter 110, filter 180 and receive mixer 150 are comprised in a common circuit block 200-1, which is referred to as a channel 200-1 in the following. Circuit 100 may comprise a multitude of channels 200-X. The embodiment shown in FIG. 2 for example has four channels 200-1; 200-2; 200-3 and 200-4, which are marked by dashed boxes. Correspondingly, one channel 200-X is dedicated to one respective signal receiver 160-X and to one respective antenna 170-X. In detail, e.g. the further antenna 170-2 is coupled to a further antenna port of a further rat-race coupler. The further rat-race coupler exhibits a further receive port coupled to a further receive mixer, and the further receive mixer is coupled to the further signal receiver 160-2. Components comprised by further channels 200-2; 200-3 and 200-4 are not explicitly shown. In other embodiments, only one channel 200-1 may be comprised, or the number of implemented channels 200-X may be two or more.

A mixer may be a device to up-convert a carrier frequency signal or local oscillator (LO) frequency signal and an intermediate frequency (IF) signal to a transceiver signal (e.g. transmit signal 120), or to down-convert a transceiver signal (e.g. a receive signal) to an IF signal using a LO frequency signal. Signal receiver 160-X may be a device configured to receive and to characterize an input, e.g. by its course, phase, amplitude, duration or range of values. Therefore, signal receiver 160-X may essentially correspond to monitoring receiver 140 in its structure or implementation. Antenna 170-X may be any device serving as a wireless interface, and be configured to transmit a transmit signal 120 or to receive a receive signal. Filter 180 may be a device or process that removes from a signal some unwanted component or feature. Filter 180 may for example be implemented as a high-pass filter, a low-pass filter or a band-pass filter. Alternatively, filter 180 may be an attenuator, or, in other words, an electronic device that reduces the power of a signal without appreciably distorting its waveform, for example to improve inter-stage matching.

Furthermore, transmitter 110 (and, accordingly, any further transmitters comprised by further channels 200-2; 200-3 and 200-4) is connected to a transmit signal distribution network 210. Filter 180 (and further filters) is connected to a test signal distribution network 220. Test signal distribution network 220 may also be, however, directly coupled to testing port 136. Receive mixer 150 (and further receive mixers) are connected to a local oscillator (LO) signal distribution network 230.

Transmit, test and LO signal distribution networks 210; 220 and 230 may be any structure configured to receive one input signal and provide a multitude of output signals at a corresponding number of interfaces. Vice versa, transmit, test and LO signal distribution networks 210; 220 and 230 may be configured to receive a multitude of input signals at a corresponding number of interfaces and provide an output signal resembling a combination of the multitude of input signals or a single one of the input signals. Transmit, test and LO signal distribution networks 210; 220 and 230 may comprise active or passive elements or both. More specifically, a signal distribution network may comprise for example a power divider, such as a Wilkinson power divider. One possible embodiment uses Wilkinson power dividers, which are reciprocal and may also be used as power combiners, having the known properties beneficial to this embodiment. All branches have equal phase delay (for example 90° for an ideal element). All branches have equal losses or reduction in amplitude and isolation between the branches. Furthermore, the Wilkinson divider is a passive structure and may be manufactured with very narrow tolerance. It is insensitive to environmental changes (for example temperature) and ageing. Wilkinson dividers may have two or three branches. To monitor more channels, it may be possible to cascade multiple dividers, as is described with respect to FIG. 2.

A Wilkinson power divider 240, as is shown in FIG. 2, has three ports, which are referred to as one primary port and two secondary ports herein. If an input signal is received at the primary port, the Wilkinson power divider may provide an output signal resembling the input signal at each secondary port. If one or several secondary ports each receive an input signal, an output signal resembling the one input signal or a combination of the several input signals may be provided at the primary port. In FIG. 2, said signal distribution networks 210; 220 and 230 each comprise three Wilkinson power dividers 240. The power dividers 240 are arranged such that the primary ports of two downstream power dividers 240 are each connected to a secondary port of an upstream power divider 240. As a net effect, for example, a signal received by the upstream power divider 240 may be split into four corresponding signals provided by the downstream power dividers 240. In other words, transmit, test and LO signal distribution networks 210; 220 and 230 each have one primary port and four secondary ports. Transmitter 110 is coupled to a secondary port of transmit signal distribution network 210. Filter 180 is coupled to a secondary port of test signal distribution network 220. Receive mixer 150 is coupled to a secondary port of LO signal distribution network 230.

A transmit signal generator 250 is further coupled between the primary port of transmit signal distribution network 210 and a node 260. A test signal generator 270 is coupled between the primary port of test signal distribution network 220 and node 260. Moreover, between test signal generator 270 and test signal distribution network 220, a parallel connection of a bypass element 280 and a monitoring mixer 290 is coupled. Furthermore, monitoring mixer 290 is connected to monitoring receiver 140. Node 260 is also connected to the primary port of LO signal distribution network 230. A local oscillator (LO) 300 is connected to node 260.

Monitoring mixer 290 may be a device implemented essentially identical to receive mixer 150. Test signal generator 270 may be configured to up-convert a LO frequency signal and an IF signal with a predefined characteristic to a test signal, or for example be a device comprising a mixer. Transmit signal generator 250 may comprise an amplifier or also comprise a mixer. LO 300 may be a device configured to provide a carrier frequency or LO frequency signal. Bypass element 280 may be for instance a device comprising a mechanic or electric switch, or a device that may be configured to act as a switch, such as a transistor or an amplifier. As an alternative to the parallel connection of monitoring mixer 290 and bypass element 280 it may be possible to employ a passive coupling structure.

In the following, two possible examples of applications for the embodiment shown in FIG. 2 are explained. For reasons of distinction, one particular channel 200-X is denoted therein as "Channel A", and any further channel 200-X is denoted as "Channel B", "Channel C", etc., respectively.

Figure 3:
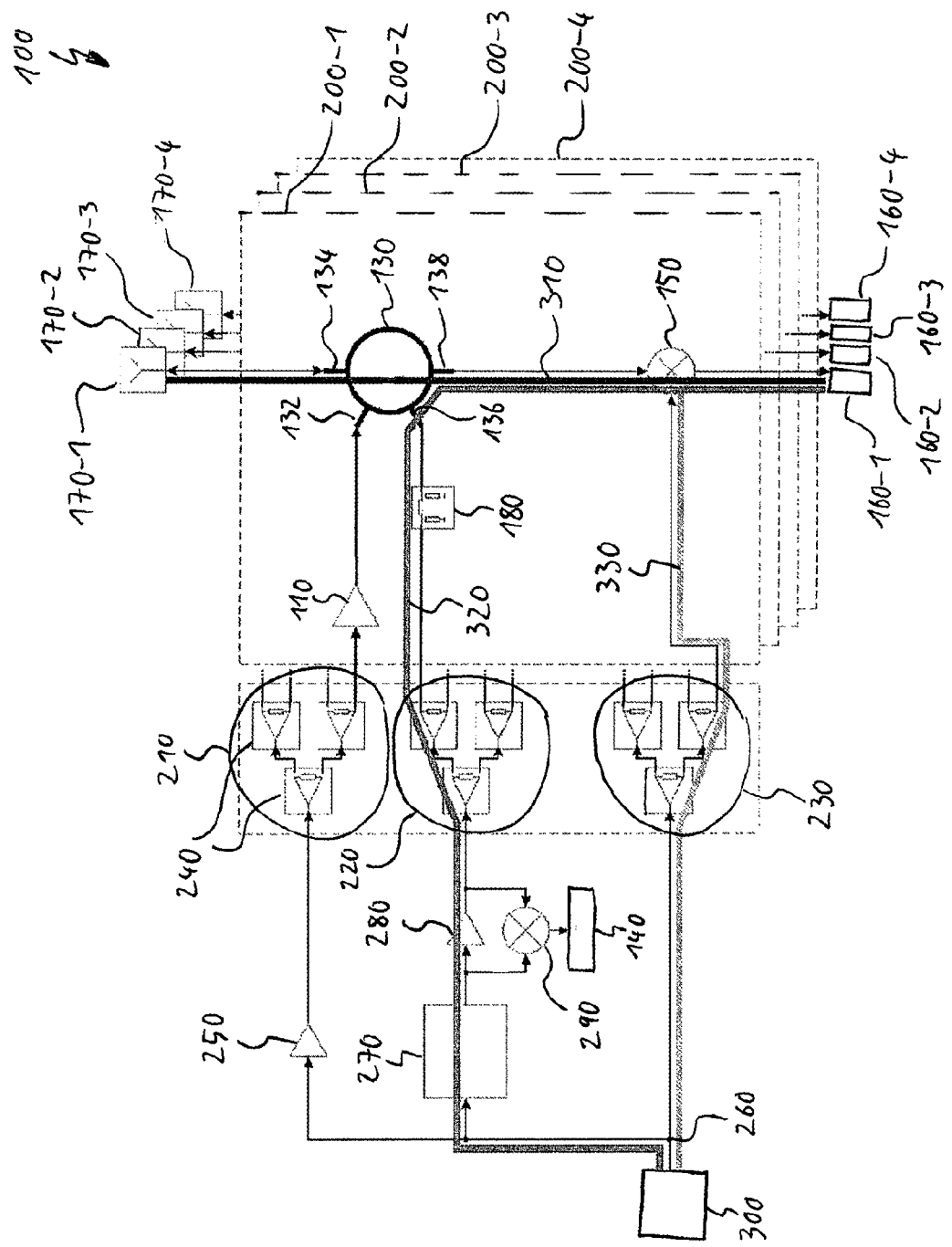
FIG. 3 shows a circuit diagram of a circuit and signal paths for receive signal monitoring according to an embodiment.

A first example application is related to a monitoring of a receiver path. FIG. 3 shows circuit 100 with components corresponding to those described in FIG. 2. In addition, the respective paths for a receive signal 310, a test signal 320 and a LO signal 330 are shown. For a receive operation, receive signal 310 is routed from antenna 170-1 through rat-race coupler 130 to the receive mixer 150 of Channel A for instance. The required LO signal 330 is delivered through LO signal distribution network 230. For testing receive mixer 150 or signal receiver 160-1, test signal generator 270 is activated, and test signal 320 is routed through test signal distribution network 220 and rat-race coupler 130 to receive mixer 150. Bypass element 280 may therein be activated to pass on test signal 320, and monitoring mixer 290 may be deactivated. By measuring the IF (intermediate frequency) signal provided by receive mixer 150 to signal receiver 160-1, a characteristic of test signal 320, may be determined. The characteristic may, for example, be attributed to a gain and phase of receive mixer 150. This process may be performed accordingly for Channels B, C or D. A deviation of characteristics of test signals 320 of different channels from each other, for example very accurate relative amplitude or phase between individual receive channels, may be calculated. The calculation may be based on a comparison of a phase or amplitude of test signal 320 for instance on Channel A to a phase or amplitude of receive signal 310 for instance on Channel B.

In some embodiments an adjustment signal is provided causing a modification of the characteristic of at least one of Channel A receive signal 310 and Channel B receive signal 310 if the comparison indicates that a deviation of the characteristic of Channel A test signal 320 from the characteristic of Channel B test signal 320 is outside a predetermined range. This may be helpful for instance for receive beam-forming applications, where determination of amplitude or phase of receive signals with high exactness is desired. Errors occurring therein may thus be reduced or even avoided. Receive beam-forming applications may for instance be employed to determine a position of an object in relation to the circuit, for example by measuring a phase shift of two representations of a common receive signal, each received by a separate receiver.

Figure 4:
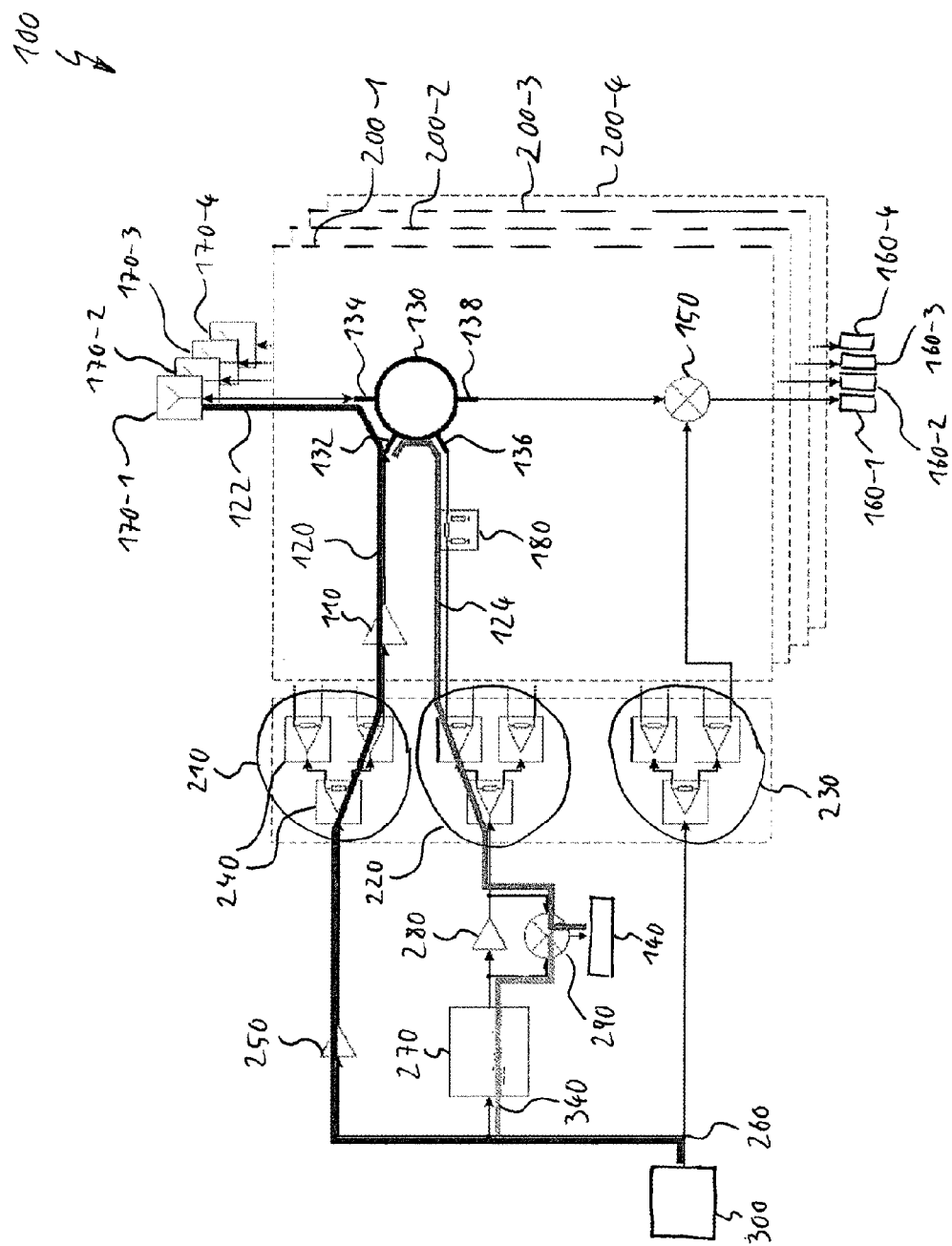
FIG. 4 shows a circuit diagram of a circuit and signal paths for transmit signal monitoring according to an embodiment.

A second example application is related to a monitoring of a transmitter path. FIG. 4 shows circuit 100 with components corresponding to those described in FIG. 2. In addition, the respective paths for transmit signal 120, the first representation of the transmit signal 122, the second representation of the transmit signal 124 and a LO signal 340 are shown. For a transmit operation, transmit signal 120 is routed through transmit signal distribution network 210, power amplifier (or transmitter 110) and rat-race coupler 130 to antenna 170. For testing the transmitter 110, a first representation of transmit signal 122 is coupled through rat-race coupler 130 to antenna 170-X. A second representation of transmit signal 124 (also denoted as transmit signal sample 124 herein) is coupled through rat-race coupler 130 and test signal distribution network 220, which may work as a signal combiner, to monitoring mixer 290. Bypass element 280 may thereby be deactivated to allow transmit signal sample 124 to be passed on to monitoring mixer 290. The required LO signal 340 is delivered through test signal generator 270, which delivers an LO signal 350 with adjustable amplitude or phase. By activating one transmitter 110 corresponding to one particular channel 200-X at a time, a characteristic of transmit signal sample 124 may be determined. For example, the individual amplitudes or phases may be determined. In other words, transmit signal samples 124 corresponding to different channels 200-X may be allocated to different time slots. Further, a deviation of the characteristic of transmit signal sample 124 in Channel A from the corresponding characteristic in Channel B may be calculated. For example, a very accurate relative amplitude and phase between individual transmit channels 200-X may be calculated. If the deviation is outside a predetermined range, an adjustment signal causing a modification of the characteristic of Channel A transmit signal 120 or Channel B transmit signal 120 is provided in a further embodiment.

In another embodiment, the deviation corresponds to a relative phase or amplitude associated to a desired beam-forming pattern to be generated using Channel A transmitter 110 and Channel B transmitter 110. In other words, at least a phase or amplitude information may be determined as the characteristic. The beam-forming pattern may comprise a phase or amplitude of one of Channel A transmit signal 120, Channel B transmit signal 120 and LO signal 350, or a phase-shift between at least two of said signals, or also a desired phase and amplitude of said signals. In transmit beam-forming applications, transmit signals may for example be required to have a predetermined phase shift (which may also be zero) at a respective point of origin (e.g. antenna) or at a given target point.

In another embodiment, a fraction of a transmit signal is coupled from the antenna feed line (in case of an integrated circuit on the chip, before the signal leaves the chip) to monitoring receiver (mixer) which performs down-conversion to analyze the resulting IF signal. This coupling point may already exist on transceivers which separate a transmit signal to the antenna and a receive signal from the same antenna via a directional coupler. This coupler has an additional port which is terminated to minimize a possible source of errors in the direction separation (between transmit and receive). At that point, a part of the transmit signal may be taken and routed to the monitoring mixer. If multiple transmit channels are to be monitored, the signals coupled from the directional couplers may be combined via a signal distribution network with known and stable amplitude and phase properties.

When transmit signal 120 of transceiver 100 is to be monitored, LO signal 350 provided to monitoring mixer 290 may also be used as a test signal for the receive mixers 150, utilizing the test signal combination network 220 in the other direction for distribution of the test signal 320 to the receivers 150. This large degree of re-use (LO and signal distribution) is also shown in FIGS. 2, 3 and 4. The solution is fully integrated into the chip in some embodiments. Some embodiments may be used in test during production as well as in a deployed, operating product. Embodiments may be robust against arbitrary phase or amplitude changes in the local oscillator chain.

In other words, according to an embodiment, the transmitter or transceiver monitoring comprises a coupling of a (small) portion of the transmit signal towards the monitoring circuitry. Furthermore, the monitoring optionally comprises a combination of these signals from multiple transmit channels into one port. One embodiment further relates to a receiver to process the signal, for example a mixer for down-conversion. A LO signal may be supplied to said mixer, which may be taken from the transmitter input. Another embodiment is related to a control algorithm to switch on and off transmitters, to activate and measure a monitoring mixer output, and to evaluate a result. A setting of the phases of the transmitters may further be controlled, for example if a scalar monitoring mixer is used. Moreover it may be possible to control a phase or an amplitude of the LO signal provided to said monitoring mixer. In FIG. 4, for example, said control of phase or amplitude may be performed by test signal generator 270. In this case a static amplitude or phase may be set in contrast to continuous modulation. In other words, the signal provided to monitoring mixer 290 may also be a modulated LO signal according to some embodiments. Modulating a signal may comprise varying or changing an amplitude or a phase of the signal. Subsequently, the LO signal and the modulated LO signal shall be summarized by the term "signal depending on the LO signal".

To describe a further embodiment with respect to FIGS. 2, 3 and 4 in other words, circuit 100 comprises a four-channel transceiver. Circuit 100 also comprises a transmit path, comprising the transmit signal distribution network 210 and at least one power amplifier 110 per channel. Circuit 100 further comprises a receive path comprising LO signal distribution network 230 and at least one receive mixer 150 per channel. Moreover, circuit 100 comprises the 'rat-race' directional coupler 130 configured to separate transmit and receive direction, and to route a signal to or from the antenna 170. Furthermore, circuit 100 comprises a test path for the receiver, said test path comprising test signal generator 270, an amplifier (or bypass element 280) to transmit test signal 320 through test signal distribution network 220 to rat-race coupler 130, where the test signal is routed to receive mixers 150. Circuit 100 also comprises a test path for the transmitter, comprising monitoring mixer 290, test signal distribution network 220 (which may work as a signal combiner) and the rat-race coupler 130, coupling a part of the TX power to the signal combiner.

It may thus be possible to make use of a signal distribution (or collection) network with well-known, stable amplitude and phase properties for providing a test signal to receivers to be tested, as well as collecting signals from transmitters to be tested. It may further be possible to use a symmetric, passive signal distribution network which may be insensitive to production variation and environmental changes, such as temperature, and stable over time (ageing).

Moreover, only one single active monitoring receiver may be used, thus possibly eliminating its sensitivity to temperature, process variation etc. when the differences of individual transmitters are determined. Furthermore, a combination of the transmitter monitoring with the receiver monitoring may be performed by using a test signal. Thus, a re-use of a large portion of one system for the other system may be enabled. Additionally, a documentation of the receiver monitoring by means of a test signal may be possible.

Figure 5:
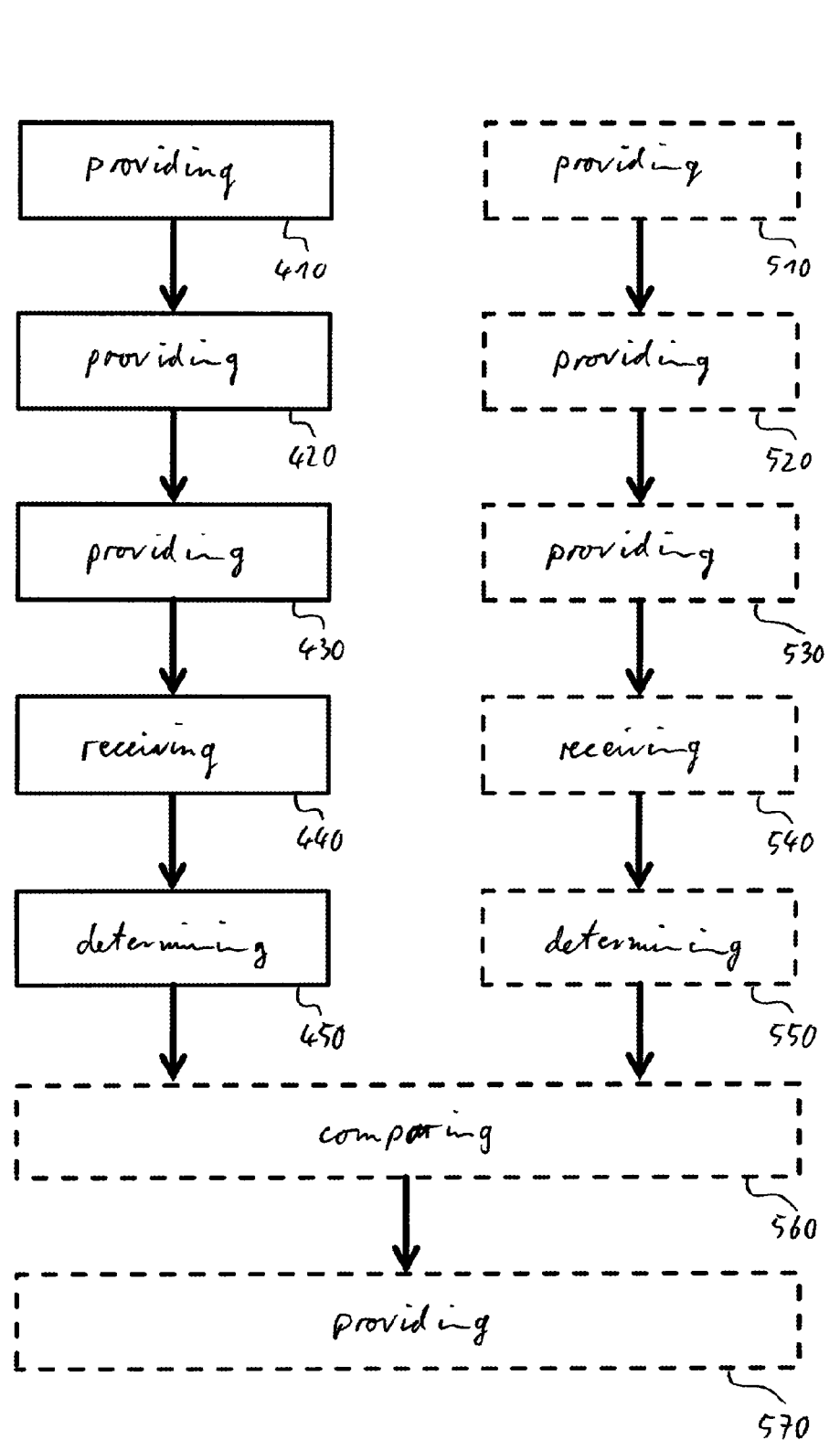
FIG. 5 shows a flow chart of a method for a circuit according to an embodiment.

FIG. 5 shows a flow chart of a method 400 for a circuit according to an embodiment. The method comprises a providing 410 of a transmit signal. Method 400 also comprises a providing 420 of a first representation of the transmit signal based on the transmit signal. Method 400 further comprises a providing 430 of a second representation of the transmit signal based on the transmit signal. Moreover, method 400 comprises a receiving 440 of the second representation of the transmit signal. Furthermore, method 400 comprises a determining 450 of a characteristic of the second representation of the transmit signal.

According to some further embodiments, method 400 comprises optional steps described in the following, which are displayed as dashed boxes in FIG. 5. Method 400 may further comprise a providing 510 of a further transmit signal. Method 400 may also comprise a providing 520 of a first representation of the further transmit signal based on the further transmit signal. Furthermore, method 400 may comprise a providing 530 of a second representation of the further transmit signal based on the further transmit signal. Moreover, method 400 may comprise a receiving 540 of the second representation of the further transmit signal. Method 400 may further comprise a determining 550 of a characteristic of the second representation of the further transmit signal.

Method 400 may also comprise a comparing 560 of the characteristic of the second representation of the transmit signal to the characteristic of the second representation of the further transmit signal. Furthermore, method 400 may comprise a providing 570 of an adjustment signal. The adjustment signal may cause a modification of the characteristic of at least one of the transmit signal and the further transmit signal if the comparison indicates that a deviation of the characteristic of the second representation of the transmit signal from the characteristic of the second representation of the further transmit signal is outside a predetermined range.

Some embodiments make use of a signal distribution network. It may thus be possible to monitor multiple receivers, multiple transmitters or multiple transmitters and receivers of a multi-channel transceiver configuration. It may further be possible to combine a monitoring mixer and an amplifier in such a way that either the amplifier is used to transmit a test signal to receivers or the monitoring mixer is used to analyze a transmit signal sample taken from transmitters. Further embodiments comprise a test signal generator, which may incorporate an IQ modulator, to generate a test signal for receiver testing or a LO signal with adjustable amplitude and phase for transmitter testing.

Embodiments may be used for instance to monitor amplitude or phase of a transmit or receive signal. It may thus be possible to send a transmit signal on a multitude of channels in a way that the transmit signals share an amplitude and a phase on the multitude of channels. Some embodiments may be used for unidirectional transmitting, unidirectional receiving or non-unidirectional receiving of signals, and may for instance be employed for radar distance sensors.

Example embodiments may further provide a computer program having a program code for performing one of the above methods, when the computer program is executed on a computer or processor. A person of skill in the art would readily recognize that steps of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A circuit, comprising:
a transmitter to provide a transmit signal;
a coupler element to receive the transmit signal at an input port, to provide a first representation of the transmit signal at an antenna port and a second representation of the transmit signal at a testing port; and
a monitoring receiver unit arranged to be coupled to the testing port, to determine a characteristic of the second representation of the transmit signal
a monitoring mixer, arranged to be coupled between the testing port and the monitoring receiver unit, to receive the second representation of the transmit signal, and to down-convert the second representation of the transmit signal; and
a bypass element, arranged to be coupled between a test signal generator and the testing port and in parallel to the monitoring mixer.

2. The circuit according to claim 1, further comprising:
a further coupler element to receive a further transmit signal at a further input port and to provide a first representation of the further transmit signal at a further antenna port and a second representation of the further transmit signal at a further testing port;
at least a further transmitter, coupled to the further input port, to provide a further transmit signal; and
wherein the monitoring receiver unit is coupled to the further testing port, to determine a characteristic of the second representation of the further transmit signal.

3. The circuit according to claim 2, further comprising a monitoring circuit coupled to the monitoring receiver, the monitoring circuit being configured to:
compare the characteristic of the second representation of the transmit signal to the characteristic of the second representation of the further transmit signal; and
provide an adjustment signal causing a modification of the characteristic of at least one of the transmit signal and the further transmit signal if a comparison indicates that a deviation of the characteristic of the second representation of the transmit signal from the characteristic of the second representation of the further transmit signal is outside a predetermined range.

4. The circuit according to claim 2, further comprising a transmit signal distribution network coupled between a transmit signal generator, the transmitter and the at least one further transmitter, the transmit signal distribution network being configured to provide the transmit signal to the transmitter and the at least one further transmitter.

5. The circuit according to claim 1, further comprising:
a test signal generator coupled to the testing port, wherein the test signal generator is configured to provide a test signal, wherein the coupler element is further configured to receive the test signal at the testing port, to provide the test signal at a receiver port, to receive a receive signal at the antenna port and to provide the receive signal at the receiver port; and
a signal receiver coupled to the receiver port, the signal receiver being configured to determine a characteristic of the test signal.

6. The circuit according to claim 5, further comprising a further coupler element configured to receive the test signal at a further testing port, to provide the test signal at a further receiver port, to receive a further receive signal at a further antenna port and to provide the further receive signal at the further receiver port; and
a further signal receiver coupled to the further receiver port, the further signal receiver being configured to determine a further characteristic of the test signal.

7. The circuit according to claim 6, further comprising:
a further monitoring circuit, coupled to the signal receiver and the further signal receiver, the further monitoring circuit being configured to:
compare the characteristic of the test signal to the further characteristic of the test signal; and
provide an adjustment signal causing a modification of the characteristic of at least one of the receive signal and the further receive signal or of one of the receiver and the further receiver if a comparison indicates that a deviation of the characteristic of the test signal from the further characteristic of the test signal is outside a predetermined range.

8. The circuit according to claim 6, further comprising:
a receive mixer coupled between the receiver port and the signal receiver, the receive mixer being configured to:
receive a local oscillator (LO) signal at a local oscillator input port; and to down-convert the signal of the receiver port using the local oscillator signal.

9. The circuit according to claim 8, further comprising:
a further receive mixer coupled between the further receiver port and the further signal receiver, the further receive mixer being configured to:
receive the local oscillator signal at a further local oscillator input port; and to down-convert the signal of the further receiver port using the local oscillator signal.

10. The circuit according to claim 9, further comprising a LO signal distribution network coupled between a local oscillator, the receive mixer and the further receive mixer, the LO signal distribution network being configured to provide the LO signal to the receive mixer and the at least one further receive mixer.

11. The circuit according to claim 6, further comprising a test signal distribution network coupled between the test signal generator, the testing port and the further testing port, the test signal distribution network being configured to provide the test signal to the testing port and the at least one further testing port.

12. The circuit according to claim 1, further comprising a transmit signal generator, coupled to the transmitter, the transmit signal generator being configured to generate a common transmit signal using a LO signal.

13. The circuit according to claim 10, further comprising a local oscillator, to provide a local oscillator signal to at least one of the test signal generator, the transmit signal generator and a receive mixer.

14. The circuit according to claim 1, further comprising a receive mixer coupled to a receiver port of the coupler element to receive signals from the antenna port.

15. The circuit according to claim 1, wherein the bypass element is arranged to be coupled to a first node, wherein the monitoring mixer is arranged to be coupled to the first node.

16. The circuit according to claim 1, wherein the characteristic is one of a frequency, an amplitude and a phase.

17. A method for a circuit, comprising:
providing a transmit signal;
splitting the transmit signal to provide a first transmit signal portion to an input port of a first directional coupler and a second first transmit signal portion to an input port of a second directional coupler;
providing at least first and second representations of the first transmit signal portion from the first directional coupler;
providing the first representation of the first transmit signal portion to an antenna;
providing the second representation of the first transmit signal portion to a distribution network;
receiving the second representation of the first transmit signal portion; and
determining a characteristic of the second representation of the first transmit signal portion.

18. The method according to claim 17, further comprising:
providing at least first and second representations of the second transmit signal portion;
providing the first representation of the second transmit signal portion to further antenna; providing the second representation of the second transmit signal portion to the distribution network;
determining a characteristic of the second representation of the second transmit signal portion.

19. A circuit, comprising:
a transmitter to provide a transmit signal;
a directional coupler, the directional coupler capable
to receive the transmit signal at an input port, to provide a first representation of the transmit signal at an antenna port and a second representation of the transmit signal at a testing port, to provide a receive signal received at the antenna port to a receiver port;
a monitoring receiver unit, arranged to be coupled to the testing port, to determine a characteristic of the second representation of the transmit signal;
a signal receiver arranged to be coupled to the receiver port;
a transmitter mixer arranged to be coupled to the input port;
a monitoring mixer arranged to be coupled to the testing port; and
a receiver mixer arranged to be coupled to the receiver port.

20. The circuit according to claim 19, wherein the monitoring mixer is arranged to down-convert the second representation of the transmit signal based on a local oscillator signal from a local oscillator input port and wherein a test signal generator is arranged to be coupled to the local oscillator input port to provide a test signal to the testing port.

* * * * *